United States Patent
Warrier et al.

(10) Patent No.: US 7,668,232 B2
(45) Date of Patent: Feb. 23, 2010

(54) SYSTEM AND METHOD TO DETERMINE POWER CUTBACK IN COMMUNICATION SYSTEMS

(75) Inventors: Dilip G. Warrier, Saratoga, CA (US); George Ginis, Mountain View, CA (US)

(73) Assignee: Texas Instruments Incorporated, Dallas, TX (US)

( * ) Notice: Subject to any disclaimer, the term of this patent is extended or adjusted under 35 U.S.C. 154(b) by 617 days.

(21) Appl. No.: 11/425,429

(22) Filed: Jun. 21, 2006

(65) Prior Publication Data

US 2007/0009020 A1 Jan. 11, 2007

Related U.S. Application Data

(60) Provisional application No. 60/697,505, filed on Jul. 8, 2005.

(51) Int. Cl.
*H04B 1/38* (2006.01)
*H04L 5/16* (2006.01)
*H04K 1/10* (2006.01)

(52) U.S. Cl. ...................... 375/222; 375/260

(58) Field of Classification Search .............. 375/260, 375/222, 259, 219
See application file for complete search history.

(56) References Cited

U.S. PATENT DOCUMENTS

| | | | |
|---|---|---|---|
| 6,456,650 B1 | 9/2002 | Cheng et al. | |
| 6,628,754 B1 | 9/2003 | Murphy et al. | |
| 6,829,307 B1 * | 12/2004 | Hoo et al. | 375/260 |
| 6,856,683 B1 | 2/2005 | Murphy et al. | |
| 2003/0054852 A1 * | 3/2003 | Ginesi et al. | 455/522 |
| 2003/0081759 A1 * | 5/2003 | Harris | 379/395.01 |
| 2003/0101206 A1 | 5/2003 | Graziano et al. | |
| 2005/0271127 A1 * | 12/2005 | Cassiers et al. | 375/219 |

FOREIGN PATENT DOCUMENTS

WO 03081830 A2 10/2003

* cited by examiner

*Primary Examiner*—David C Payne
*Assistant Examiner*—Brian J Stevens
(74) *Attorney, Agent, or Firm*—Steven A. Shaw; W. James Brady; Frederick J. Telecky, Jr.

(57) ABSTRACT

A system and method for adaptively determining power cutback in communication system is described. According to an embodiment, the receiver determines noise on each sub-channel for different internal gain settings. It calculates what gain setting would be optimal from an SNR point of view and what power cutback value would lead to that gain setting.

10 Claims, 2 Drawing Sheets

SYSTEM AND METHOD TO DETERMINE POWER CUTBACK IN COMMUNICATION SYSTEMS

RELATED APPLICATION

The present application is related to and claims priority from U.S. Provisional Patent Application Ser. No. 60/697,505 filed on Jul. 8, 2005 entitled "Adaptive Algorithm to Determine Power Cutback in DSL Systems" and assigned to the assignee of the present application. This application is incorporated by reference herein in its entirety for all purposes.

BACKGROUND

1. Field of the Invention

The invention relates to power management in communication systems and in particular, adaptive power cutback in DSL communication systems.

2. Description of the Related Art

Telecommunication standards such as ITU G.992.5 define power management in ADSL communication. At the beginning of communication, the transmitter and the receiver go through a process of negotiating various parameters of the communication over the given loop, which is typically referred to as the training period. One of the parameters of communication is the power level at which the transmitter sends its signal. During the training period, the receiver determines the appropriate power level at which the signal should be transmitted. It then communicates this power level to the transmitter and the transmitter may use this power level for later signals that are transmitted to the receiver.

Typically, the receiver balances the transmitted power of the signal with its internal gain to ensure the best data rate and margin on the loop. If the receiver determines that it can increase the internal gain for better signal reception, then the receiver requests the transmitter to cut back power such that the combination of the low power signal and the internal gain of the receiver can still provide the best performance on the loop. The choice of power cutback (PCB) values also has several other functions for example, some DSL standards mandate a reduction in upstream transmitted power based on estimates of the loop length, a receiver may choose PCB values to prevent internal saturation in short loops, a receiver may choose PCB values to reduce the SNR margins in cases where the achievable margins are higher than required and the like.

Generally, PCB values are chosen from lookup tables. These lookup tables are derived in laboratories based on simulations of loop lengths and noise. A typical procedure includes simulating certain loop length and possibly noise conditions in the lab, calculating the best possible value of PCB for those conditions (off-line), storing these values in a lookup table in a modem and iterating these steps for an exhaustive list of loop lengths and noise conditions. When a modem is deployed in the field, it can estimate the loop length and noise condition and determine the corresponding choice of PCB from the pre-stored lookup table. However, several problems exist with this approach. For example, it is impractical to determine a completely exhaustive list of loop lengths and noise conditions due to memory constraints in each modem, the value of noise conditions are pre-determined and so they do not account for dynamic changes in conditions such as environmental changes in the chip and the like. Further, the process of calculating the look-up tables needs to be repeated whenever there are changes made to the modem such as silicon revisions, component changes, software changes affecting noise performance etc. Due to these factors, existing modems use approximations in many cases. These approximations may lead to sub-optimal performance.

Therefore, it is desirable to implement an adaptive power cutback algorithm in modems that can estimate the line conditions and dynamically calculate the optimal PCB value for the given conditions.

SUMMARY

Accordingly, the present application describes a system and method for adaptively determining power cutback in a communication system. According to an embodiment, the receiver determines the noise on each sub-channel and separates it into two components: internal noise generated within the receiver, and external noise from the line. The internal gain of the modem can be increased to mitigate the effect of the internal noise requiring a power cutback at the transmitter (to keep the net gain same). The power cutback at the transmitter exacerbates the effect of the external noise, which is again balanced by internal gain to optimize the performance over a given loop condition.

The foregoing is a summary and thus contains, by necessity, simplifications, generalizations and omissions of detail; consequently, those skilled in the art will appreciate that the summary is illustrative only and is not intended to be in any way limiting. As will also be apparent to one of skill in the art, the operations disclosed herein may be implemented in a number of ways, and such changes and modifications may be made without departing from this invention and its broader aspects. Other aspects, inventive features, and advantages of the present invention, as defined solely by the claims, will become apparent in the non-limiting detailed description set forth below.

DESCRIPTION OF THE PREFERRED EMBODIMENT(S)

Figure 1:
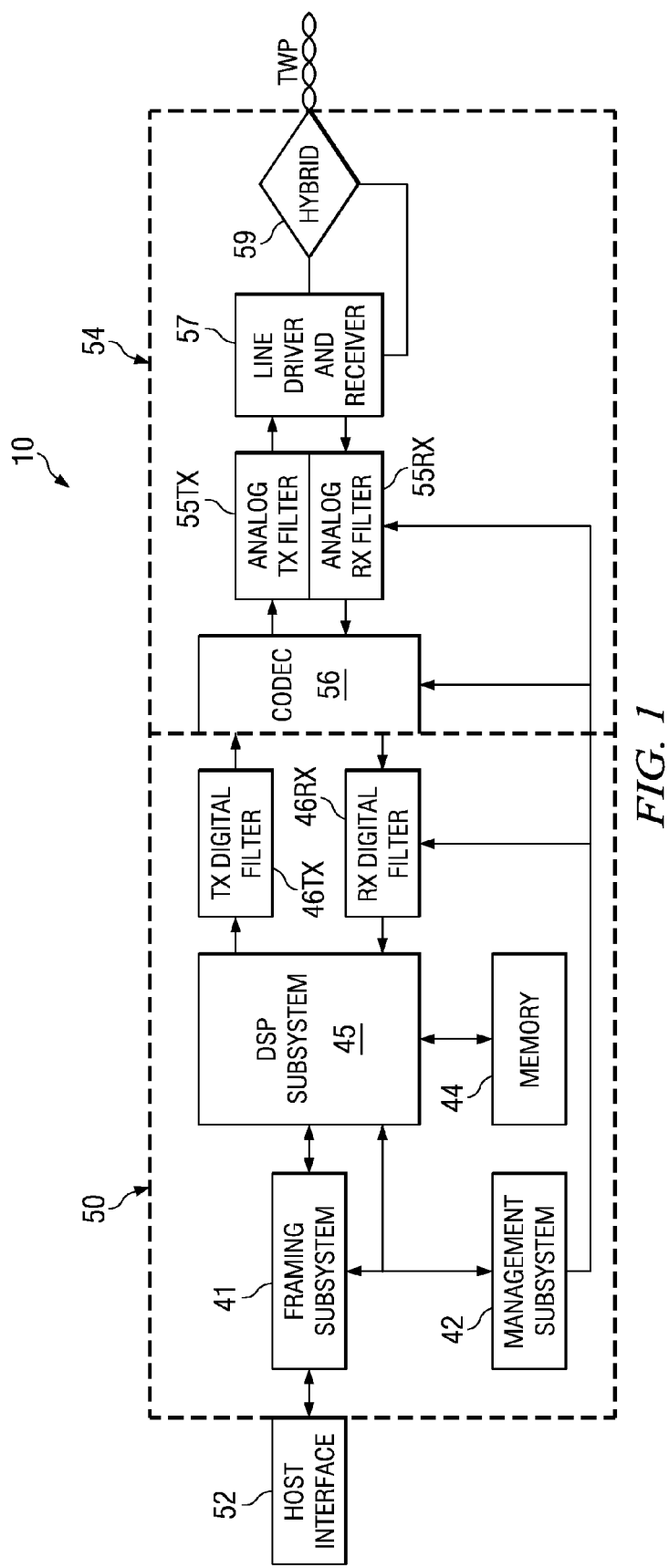
FIG. 1 illustrate an exemplary architecture of a modem, as may be deployed as customer premises equipment (CPE) according to an embodiment.

FIG. 1 illustrates an exemplary architecture of a modem 20, as may be deployed as customer premises equipment (CPE) according an embodiment. The construction of the CPE modem 20 shown in FIG. 1 is provided by way of example only, and is meant only to illustrate a possible modem architecture into which the preferred embodiment of the invention may be implemented. Of course, the invention may be implemented in DSL modems of different architectures, and in communications equipment of similar and different architectures for different communications applications.

CPE modem 20 is effectively a transceiver, in the sense that it can both transmit and receive signals over twisted pair facility TWP, which corresponds to transmission channel. According to this preferred embodiment of the invention, CPE modem 20 includes digital transceiver 50, which is coupled to host interface 52 for communicating with the client side host computer, which is typically a personal computer that may be coupled to modem 20 via a router or other network adapter, for example. Considering that CPE modem 20 is intended as CPE, digital transceiver 50 in this example supports one communications port, such as shown in FIG. 1 in which digital transceiver 50 is connected to a single instance of analog front end 54, which in turn couples to twisted-pair wire facility TWP. Alternatively, digital transceiver 50 may support multiple communications ports, for example in a "bonded" DSL environment in which modem 20 receives downstream signals over two separate twisted pair facilities, in which case each port would be realized by an instance of analog front end 54. Analog front end 54 in this example includes hybrid circuit 59, which is a conventional circuit that is connected to transmission loop LP, and that converts the two-wire arrangement of the twisted-pair facility to dedicated transmit and receive lines connected to line driver and receiver 57, considering that bidirectional signals are communicated over facility TWP by CPE modem 20.

Line driver and receiver 57 is a high-speed line driver and receiver for driving and receiving ADSL signals over twisted-pair lines. Line driver and receiver 57 is bi-directionally coupled to coder/decoder ("codec") circuit 56 via analog transmit and receive filters 55TX, 55RX, respectively. Codec 56 in analog front end 54 performs the conventional analog codec operations on the signals being transmitted and received, respectively. These functions include digital and analog filtering, digital-to-analog conversion (transmit side), analog-to-digital conversion (receive side), attenuators, equalizers, and echo cancellation functionality, if desired. Examples of conventional devices suitable for use as analog front end 54 according to the preferred embodiment of the invention include conventional integrated analog front end devices.

Digital transceiver 50 includes framing subsystem 41, which is coupled to the fiber optic side of transceiver 50, and which formats digital data to be transmitted into frames, or blocks, for modulation and transmission. DSP subsystem 45 of digital transceiver 50 is preferably one or more digital signal processor (DSP) cores, having sufficient computational capacity and complexity to perform much of the digital processing in the encoding and modulation (and demodulation and decoding) of the signals communicated via digital transceiver 50. Transceiver 50 also includes memory resources 44, including both program and data memory, accessible by DSP subsystem 45 in carrying out its digital functions, for example according to software stored in memory resources 44. These digital functions includes the IDFT modulation (and DFT demodulation of received signals), appending (and removal) of cyclic extensions, among other conventional digital functions.

Digital transceiver 50 also includes transmit and receive digital filters 46TX, 46RX, respectively, for applying the appropriate filter functions to the transmitted and received signals, respectively. Digital filters 46TX, 46RX may be executed by DSP subsystem 45 according to the corresponding software routines, as known in the art, or alternatively may be realized as separate hardware resources. Management subsystem 42 implements and effects various control functions within digital transceiver 50, communicating with each of the major functions of digital transceiver 50 to control its operation according to the desired number of ports to be supported. In addition, management subsystem 42 issues control lines to receive digital filters 46RX, to receive analog filter 55RX, and to codec 56. As will become apparent in connection with the preferred embodiment of the invention described below, management subsystem 42 can adjust these receive filters and the sampling rate applied by codec 56 to attain improved data rate performance, depending on the particular conditions of the channel.

As mentioned above, the architecture shown in FIG. 1 is presented by way of example only. Alternative architectures for DSL modem communication, and for other multi-carrier modulation communication systems such as OFDM wireless communications, are also contemplated to be within the scope of the invention, and may be implemented by those skilled in the art having reference to this specification, without undue experimentation.

Figure 2:
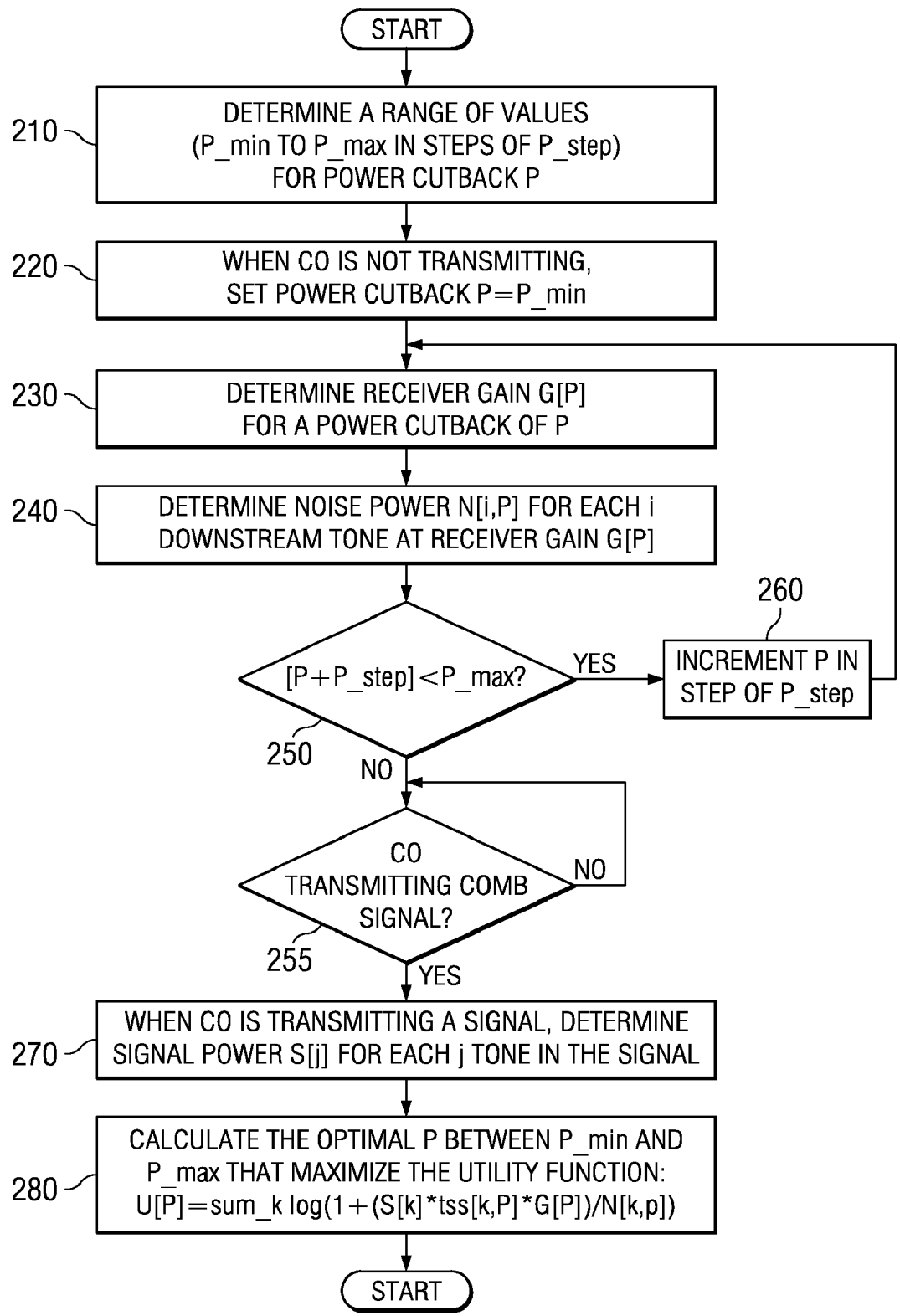
FIG. 2 is a flowchart illustrating exemplary steps performed during the process of calculating an optimal value of power cutback according to an embodiment.

FIG. 2 is a flowchart illustrating exemplary steps performed during the process of calculating an optimal value of power cutback according to an embodiment. Initially, the process determines a range of values for a power cutback of P. The PCB values are between P_min and P_max in steps of P_step (210). The values P_min, P_step, and P_max are usually chosen from the appropriate DSL standard. For instance, the G.992.5 standard requires them to be 0, 1 and 40 dB respectively. During a period when the CO is not transmitting any signal, the PCB calculation begins with PCB P=P_min (220). With the PCB value of P_min, the process determines the cumulative receiver gain G[P] that is needed if the CO applies the power cutback of value P (230).

The process next applies the gain G[P] in the receiver and measures the resultant noise power N[i, P] obtained for each tone 'i' in the downstream band (240). The process determines whether P+P_step<P_max (250). If P+P_step<P_max, then P is incremented by P_step (260) and the process returns to step 230. If P+P_step is not less than P_max, then the process moves on to the next step which involves waiting for the CO to transmit a signal (255). When the signal is received, the process determines the received signal power S[k] for each tone 'k' that was transmitted in the signal (270). Once the signal power for each tone is determined, the process then calculate the optimal value P of the power cutback between P_min and P_max with step P_step such that the value maximizes the following utility function:

$$U[P]=\text{sum}\_k \log(1+(S[k]*tss[k, P]*G[P])/N[k,P])$$

where k is the set of all downstream tones and tss[k, P] represents the ceiling-based power cutback as described in the G.992.5 standard. The value of S[k] may not be available for all downstream tones since the signal used may not contain all tones. In that case, the values for tones that are not present in the signal can be interpolated from the values for tones that are present. In this fashion, any signal during DSL initialization, such as handshake, Comb, Reverb or Medley, can be used for purposes of PCB estimation.

Sometimes, due to chip-to-chip variations in analog front-ends (e.g. due to process variation and the like), it becomes difficult to analytically determine some gain settings that contribute to G[P]. In such cases, G[P] can be separated as G1[P]*G2[P] where G1[P] represents the part of the gain that varies from chip to chip and G2[P] is the part that does not vary from chip to chip. Thus, the utility function U[P] can be reformulated as:

$$U[P]=\text{sum}\_k \log(1+(S[k]*G1[P]*tss[k,P]*G2[P])/N[k,P])$$

In step 270, the process would then calculate S[k]*G1[P] for each choice of P instead of just S[k] as originally formulated. This leads to more robust estimates of the gain setting. Sometimes, the set of all possible values of G1[P] can be smaller than the set of all possible values of P. In such case, the set S[k]*G1[P] may be calculated for all possible values of G1[P], thus reducing the computation time. Further, for high values of SNRs, the term 1 in the equation above can be ignored. In such cases, the following simplification holds.

$$U[P]=\text{sum}\_k \log(S[k])+\text{sum}\_k \log(tss[k,P])+\text{sum}\_k \log(G[P])-\text{sum}\_k \log(N[k,P])$$

Thus, each of these quantities can be calculated separately, reducing the amount of intermediate information that would otherwise need to be stored during the course of this algorithm. These approximations may be combined to give additional savings.

Realizations in accordance with the present invention have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of the invention as defined in the claims that follow.

What is claimed is:

1. A method for determining optimal power cutback in a communication device comprising:

determining gain G[P] of the device for each one of a plurality of device power levels P;

determining noise power N[i, P] for each i tone of a plurality of downstream tones at each gain G[P];

determining signal power S[j] for each j tone of a plurality of tones in a received signal;

determining an optimal power for the device that maximize a utility function $$U[P] = \text{sum}\_k \log(1 + (S[k] * tss[k, P] * G[P])/N[k, P])$$

where k is a set of all downstream tones and tss[k, P] represents a ceiling-based power cutback; and decreasing transmission power of transmitter based ceiling-based power cutback.

2. A method according to claim 1, wherein the plurality of device power levels include a minimum power level P_min and a maximum power level P_max and the gain G[P] is determined for each power level in a predetermined power level increment of P_step.

3. A method according to claim 2, wherein the gain G[P] is determined from the minimum power level P_min to the maximum power level P_max in steps P_step.

4. A method according to claim 1, wherein the device power level is set a P_min when the device is not receiving any transmission.

5. A method according to claim 1, wherein the signal is received from a central office in a communication system.

6. A communication device comprising:

a host interface configured to receive user data;

a hybrid interface configured to interface with a communication network;

a control unit coupled to the host interface and the hybrid interface, wherein control unit is configured to determine gain G[P] of the device for each one of a plurality of device power levels P;

determine noise power N[i, P] for each i tone of a plurality of downstream tones at each gain G[P];

determine signal power S[j] for each j tone of a plurality of tones in a received signal;

determine an optimal power for the device that maximize a utility function $$U[P] = \text{sum}\_k \log(1 + (S[k] * tss[k, P] * G[P])/N[k, P])$$

where k is a set of all downstream tones and tss[k, P] represents a ceiling-based power cutback.

7. A device according to claim 6, wherein the plurality of device power levels include a minimum power level P_min and a maximum power level P_max and the gain G[P] is determined for each power level in a predetermined power level increment of P_step.

8. A device according to claim 7, wherein the gain G[P] is determined from the minimum power level P_min to the maximum power level P_max in steps P_step.

9. A device according to claim 6, wherein the device power level is set at P_min when the device is not receiving any transmission.

10. A device according to claim 6, wherein the signal is received from a central office in a communication system.

* * * * *

UNITED STATES PATENT AND TRADEMARK OFFICE
CERTIFICATE OF CORRECTION

PATENT NO. : 7,668,232 B2  Page 1 of 1
APPLICATION NO. : 11/425429
DATED : February 23, 2010
INVENTOR(S) : Warrier et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 864 days.

Signed and Sealed this

Twenty-eighth Day of December, 2010

David J. Kappos
*Director of the United States Patent and Trademark Office*